(12) United States Patent
Kagata et al.

(10) Patent No.: US 9,657,187 B2
(45) Date of Patent: May 23, 2017

(54) INK COMPOSITION AND RECORDING METHOD

(71) Applicant: Seiko Epson Corporation, Tokyo (JP)

(72) Inventors: Takayoshi Kagata, Shiojiri (JP);
Masahiro Yatake, Shiojiri (JP);
Hiroshi Mukai, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/669,371

(22) Filed: Mar. 26, 2015

(65) Prior Publication Data
US 2016/0244626 A1 Aug. 25, 2016

(30) Foreign Application Priority Data

Mar. 27, 2014 (JP) ................. 2014-065433

(51) Int. Cl.
C09D 11/107 (2014.01)
C09D 11/033 (2014.01)
C09D 11/10 (2014.01)
C09D 11/322 (2014.01)

(52) U.S. Cl.
CPC .......... *C09D 11/107* (2013.01); *C09D 11/033* (2013.01); *C09D 11/10* (2013.01); *C09D 11/322* (2013.01)

(58) Field of Classification Search
None
See application file for complete search history.

(56) References Cited

U.S. PATENT DOCUMENTS

| 5,814,685 A | 9/1998 | Satake et al. |
| 2002/0107303 A1 | 8/2002 | Miyabashi et al. |
| 2010/0196601 A1* | 8/2010 | Goto ............ B41M 5/0023 427/256 |

(Continued)

FOREIGN PATENT DOCUMENTS

| EP | 0796901 A2 | 9/1997 |
| EP | 2423274 A1 | 2/2012 |
| EP | 2423275 A1 | 2/2012 |

(Continued)

OTHER PUBLICATIONS

Extended European Search Report for Patent Application No. EP 15161300.7 dated Jun. 30, 2015 (8 pages).

*Primary Examiner* — An Do
*Assistant Examiner* — Renee I Wilson
(74) *Attorney, Agent, or Firm* — Harness, Dickey & Pierce, P.L.C.

(57) ABSTRACT

An ink composition includes a pigment; polymer particles; and a polar solvent with a boiling point of 150° C. or higher, in which the polymer particles include a core polymer and a shell polymer that covers at least a portion of the core polymer, a glass transition point of the polymer that configures the core polymer is more than 30° C. lower than the glass transition point of the polymer that configures the shell polymer, the polymer that configures the shell polymer includes a polymer having a (meth)acrylate monomer unit and a carboxylic acid monomer unit, the content (solid content conversion) of the polymer particles is 1.0 mass % to 10 mass % with respect to the total amount of the ink composition, and the content of the polar solvent is 10 mass % to 40 mass % of the total amount of the ink composition.

18 Claims, 1 Drawing Sheet

(56) References Cited

U.S. PATENT DOCUMENTS

2014/0362136 A1    12/2014   Yatake

FOREIGN PATENT DOCUMENTS

| | | |
|---|---|---|
| JP | 09-249838 A | 9/1997 |
| JP | 11-029731 A | 2/1999 |
| JP | 2004-067861 A | 3/2004 |
| JP | 2011-144334 A | 7/2011 |
| WO | WO-2013-051726 A1 | 4/2013 |
| WO | WO-2014-042651 A1 | 3/2014 |

* cited by examiner

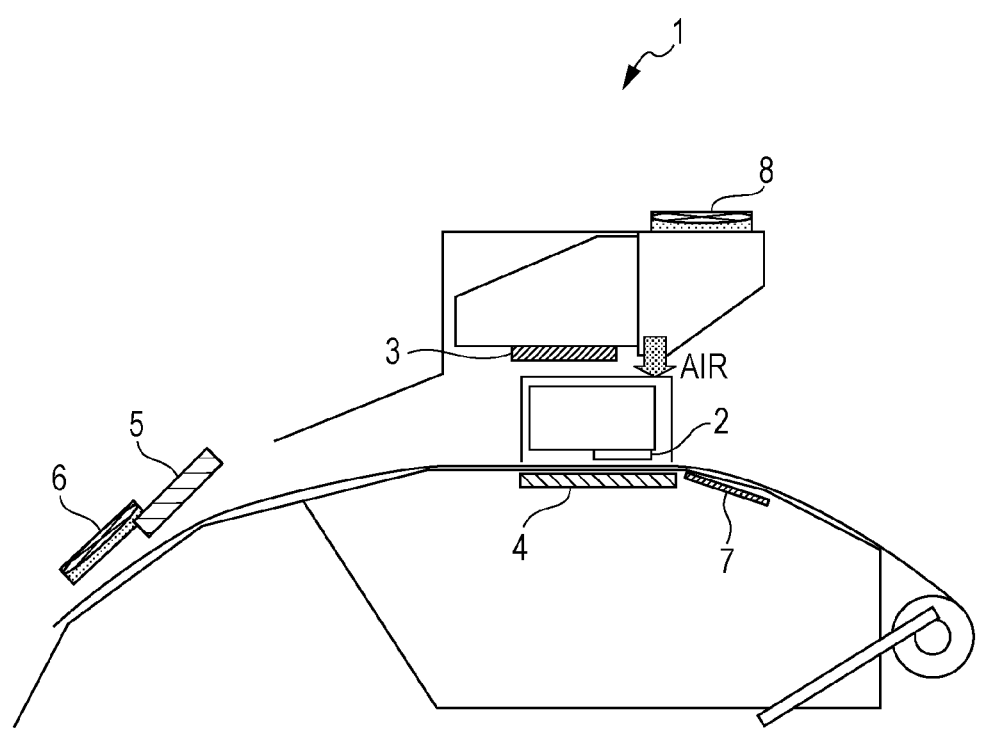

INK COMPOSITION AND RECORDING METHOD

BACKGROUND

The entire disclosure of Japanese Patent Application No. 2014-065433, filed Mar. 27, 2014 is expressly incorporated by reference herein.

1. Technical Field

The present invention relates to an ink composition and a recording method.

2. Related Art

The ink jet recording method is able to record high definition images with a comparatively simple device, and rapid development has been made on various fronts. Among these, clogging or the like of ink jet nozzles has been variously researched. JP-A-9-249838 discloses providing a pigment type aqueous ink jet recording liquid that provides the characteristics demanded as an ink jet recording liquid, in particular excellent waterproofness, light resistance, resolution, and stable discharge, without clogging of the nozzles, and discloses an ink jet recording liquid in which a pigment and a resin are dispersed in an aqueous medium, where the resin is an aqueous emulsion formed from a gel formed from a polymer with a glass transition point of 50° C. to 150° C. and a core formed from a polymer with a glass transition point of −100° C. to 40° C.

However, JP-A-9-249838 does not disclose a difference between the glass transition temperatures of the core polymer and the shell polymer. The ink composition disclosed in JP-A-9-249838 has 0.8 mass % of pigment content (solid content conversion) and the content of the polymer particles in relation thereto is a comparatively small 2 mass % to 4 mass %. Incidentally, in a case where the content of the pigment is comparatively large, the resin ordinarily used also increases, thereby increasing the viscosity of the ink composition. In so doing, a problem arises of clogging of the nozzles easily occurring and recovery from clogging becoming difficult.

In order to record on a low-absorbency recording medium or a non-absorbent recording medium, it is preferable that comparatively large amount of polar solvent and resin is used, from the viewpoint of securing abrasion resistance. However, because the boiling point of the polar solvent is generally high, and because drying the ink composition becomes difficult when large amounts are used, a long time is necessary for drying and as a result, a problem arises of aggregation unevenness occurring. When the recording medium is heated at a comparatively high temperature in order to resolve this problem, a problem arises of deformation of the medium or clogging of the nozzles easily occurring.

SUMMARY

An advantage of some aspects of the invention is to provide an ink composition that easily recovers from nozzle clogging and does not easily lead to aggregation unevenness while maintaining a high degree of abrasion resistance and a recording method using the ink composition.

The inventors have conducted intensive research in order to solve the above problems. As a result, the inventors have determined that it is possible to solve the problem by using predetermined polymer particles and a predetermined polar solvent, and the invention was completed. That is, the invention is as follows.

(1) According to an aspect of the invention, there is provided an ink composition, including a pigment; polymer particles; and a polar solvent with a boiling point of 150° C. or higher, in which the polymer particles include a core polymer and a shell polymer that covers at least a portion of the core polymer, a glass transition point of the polymer that configures the core polymer is more than 10° C. lower than the glass transition point of the polymer that configures the shell polymer, the polymer that configures the shell polymer includes a polymer having a (meth)acrylate monomer unit and a carboxylic acid monomer unit, the content (solid content conversion) of the polymer particles is 1.0 mass % to 10 mass % with respect to the total amount of the ink composition, and the content of the polar solvent is 10 mass % to 40 mass % of the total amount of the ink composition.

(2) In the ink composition according to (1), it is preferable that the polar solvent includes 5.0 mass % or more of the polar solvent with a boiling point of 190° C. or higher and 220° C. or lower, with respect to the total amount of the ink composition.

(3) In the ink composition according to (1) or (2), it is preferable that the content of the polar solvent with a boiling point of 260° C. or higher is 5.0 mass % or less with respect to the total amount of the ink composition.

(4) In the ink composition according to any one of (1) to (3), it is preferable that the polar solvent includes mass % or more of a nitrogen-containing solvent with respect to the total amount of the ink composition.

(5) In the ink composition according to any one of (1) to (4), it is preferable that recording is performed on a heated recording medium.

(6) In the ink composition according to any one of (1) to (5), it is preferable that the viscosity reduction rate from the viscosity at 20° C. to the viscosity at 50° C. is 40% to 80%.

(7) In the ink composition according to any one of (1) to (6), it is preferable that the glass transition point of the polymer that configures the core polymer is −10° C. or higher to 60° C. or lower.

(8) In the ink composition according to any one of (1) to (7), it is preferable that the glass transition point of the polymer that configures the shell polymer is 40° C. or higher.

(9) In the ink composition according to any one of (1) to (8), it is preferable that the polymer particles include 0.50 mass % to 20 mass % of specified polymer particles with respect to the total amount of the polymer particles, the specified polymer particles have a mass ratio (c/s) of the mass of the core polymer (c) and the mass of the shell polymer (s) of 0.40 to 4.0, and a ratio ((c/s)/φ) between the average particle diameter φ (unit: nm) of the polymer particles and the mass ratio (c/s) of 0.010 or more.

(10) In the ink composition according to any one of (1) to (9), it is preferable that the acid value of the polymer that configures the core polymer is 30 mgKOH/g or less, and the acid value of the polymer that configures the shell polymer is 20 to 400 mgKOH/g.

(11) In the ink composition according to any one of (1) to (10), it is preferable that the polymer that configures the core polymer includes a polymer having a hydrophobic monomer unit, and the polymer that configures the shell polymer includes a polymer having a methyl (meth)acrylate monomer unit or an ethyl (meth)acrylate monomer unit.

(12) According to another aspect of the invention, there is provided a recording method including a first heating that heats surface temperature of a recording medium to 30° C. to 70° C.; attaching that discharges the ink composition according to any one of (1) to (11) from a nozzle, and attaches the ink composition on the heated recording medium; and a second heating that heats the recording medium to which the ink composition is attached to 40° C. to 120° C.

(13) In the recording method according to (12), it is preferable that, in the attaching, the ink composition is discharged such that the maximum impact amount of the ink composition is 16.8 mg/inch$^2$ or less.

BRIEF DESCRIPTION OF THE DRAWING

The invention will be described with reference to the accompanying drawing, wherein like numbers reference like elements.

FIGURE is a schematic cross-sectional view showing the configuration of a recording apparatus able to be used in the embodiment.

DESCRIPTION OF EXEMPLARY EMBODIMENTS

Below, although forms (below, referred to as embodiments) for carrying out the invention are described in detail while referring to the drawings as necessary, the invention is not limited thereto, and various modifications are possible in a range not departing therefrom. In the drawings, like elements are given like references, and overlapping explanation thereof will not be provided. Unless otherwise noted, the position relationship, such as up, down, left, and right, are based on the positional relationships shown in the drawings. Furthermore, the dimensions and ratios in the drawings are not limited to the ratios in the drawings. The wording "(meth)acrylic" in the description signifies "acrylic" and "methacrylic" corresponding thereto, and the wording "(meth)acrylate" signifies "acrylate" and "methacrylate" corresponding thereto.

Ink Composition

An ink composition includes a pigment; polymer particles; and a polar solvent with a boiling point of 150° C. or higher, in which the polymer particles include a core polymer and a shell polymer that covers at least a portion of the core polymer, a glass transition point of the polymer that configures the core polymer is more than 10° C. lower than the glass transition point of the polymer that configures the shell polymer, the polymer that configures the shell polymer includes a polymer having a (meth)acrylate monomer unit and a carboxylic acid monomer unit, the content (solid content conversion) of the polymer particles is 1.0 mass % to 10 mass % with respect to the total amount of the ink composition, and the content of the polar solvent is 10 mass % to 40 mass % of the total amount of the ink composition.

Pigments

Although not particularly limited, examples of the pigment include the following pigments for each color of the ink composition.

Examples of the carbon black used in the black ink include No. 2300, No. 900, MCF 88, No. 33, No. 40, No. 45, No. 52, MA7, MA8, MA100, No. 2200B and the like (all manufactured by Mitsubishi Chemical Corporation); Raven 5750, Raven 5250, Raven 5000, Raven 3500, Raven 1255, Raven 700 and the like (all manufactured by Carbon Columbia Co., Ltd.); Regal 400R, Regal 330R, Regal 660R, Mogul L, Monarch 700, Monarch 800, Monarch 880, Monarch 900, Monarch 1000, Monarch 1100, Monarch 1300, Monarch 1400 and the like (manufactured by Cabot Japan K.K.); and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all manufactured by Degussa AG).

Examples of the pigment used in the white ink included C.I. Pigment White 6, 18, and 21.

Examples of the pigment used in the yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in the magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:4, 57, 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violet 19, 23, 32, 33, 36, 38, 43, and 50.

Examples of the pigment used in the cyan ink include C.I. Pigment Blue 1, 2, 3, 15, 15:1, 15:2, 15:3, 15:34, 15:4, 16, 18, 22, 25, 60, 65, and 66, and C.I. Vat Blue 4, and 60.

Examples of pigments other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Although not particularly limited, examples of the white pigment include white inorganic pigments such as titanium oxide, zinc oxide, zinc sulfide, antimony oxide, and zirconium oxide. In addition to the white inorganic pigments, it is possible to use white organic particles, such as white hollow resin particles and polymer particles.

The pigments are preferably used singly, or two or more types are preferably used together.

It is preferable that the average particle diameter of the pigment is 50 nm to 500 nm, 60 nm to 400 nm is more preferable, and 70 nm to 350 nm is still more preferable. The light resistance tends to decrease due to the particle size being 50 or higher. The precipitation tends to become faster due to the particle size being 500 nm or less. The precipitation capacity and the light resistance tend to be superior due to the average particle diameter of the pigment being within the above range. The average particle diameter of the pigment indicates the volumetric average particle diameter able to be obtained by a dynamic light scattering method.

It is preferable that the content of the pigment in the ink composition is 8.0 mass % or less with respect to the total amount of the ink composition, 6.0 mass % or less is more preferable, and 4.0 mass % or less is still more preferable. Even in such an ink composition, the abrasion resistance of the obtained recording material and recovery from clogging tend to be superior by using the polymer particles described later. The lower limit of the content of the pigment is not particularly limited, and the content of the pigment is preferably 0.1 mass % or more with respect to the total amount of the ink composition.

Below, the expression "the polymer that configures the core polymer or shell polymer includes (or has) XXX polymer" is used. However, this expression does not exclude cases where the core polymer or shell polymer is configured by one type of polymer.

Polymer Particles

The viscosity of the ink composition increases when a large amount of resin is used to secure abrasion resistance, and there is a problem of the discharge stability or clogging recovery lowering. In contrast, by the ink composition of the embodiment using the specified polymer particles, even in a case of using large amounts, it is difficult for the viscosity to rise and there is an effect of both the discharge stability and the clogging recovery being excellent while maintaining a high degree of abrasion resistance. Below, this is specifically described.

The polymer particles include a core polymer and a shell polymer that covers at least a portion of the core polymer, and the glass transition point that configures the core polymer is more than 30° C. lower than the glass transition point of the polymer that configures the shell polymer. Through the glass transition point of the polymer that configures the core polymer being more than 10° C. lower than the glass transition point of the polymer that configures the shell polymer, it is possible to prevent the mixing of the two and to create functional isolation. As a result, it is possible for the abrasion resistance of the image recorded on the recording medium and the discharge stability to be further improved. By making the glass transition point (Tgc) of the polymer that configures the core polymer more than 15° C. lower than the glass transition point (Tgs) of the polymer that configures the shell polymer (that is, the relationship Tgc<Tgs −15° C.), because the core polymer with the lower Tg flows out after the shell polymer is softened by heating after discharge, the adhesiveness of the ink composition with respect to the recording medium is further improved. By making the glass transition point of the polymer that configures the shell polymer more than 40° C., and more preferably more than 45° C., higher than the glass transition point of the polymer that configures the core polymer, because it becomes difficult for the ink composition that includes the polymer particles to fuse inside the recording head, the discharge stability is improved. From this viewpoint, it is preferable that the difference between the glass transition point of the polymer that configures the core polymer and the glass transition point of the polymer that configures the shell polymer is more than 50° C., and more than 70° C. is more preferable. Meanwhile, the difference between the glass transition point of the polymer that configures the core polymer and the glass transition point of the polymer that configures the shell polymer is preferably less than 130° C., or preferably less than 110° C., or preferably less than 100° C. That is, it is preferable that the difference between the glass transition point of the polymer that configures the core polymer and the glass transition point of the polymer that configures the shell polymer is more than 30° C. and less than 130° C., more than 50° C. and less than 110° C. is more preferable, and more than 70° C. and less than 100° C. is still more preferable.

The content of the polymer particles (solid content conversion) is 2.0 mass % or more with respect to the total amount of the ink composition, and 2.5 mass % or more is more preferable, and 3.0 mass % or more is still more preferable. By the content of the polymer particles being 3.0 mass % or more, the abrasion resistance of the obtained recording material is improved, meanwhile, it is possible for the rise in viscosity of the ink composition to be suppressed to be comparatively low. It is preferable that the content of the polymer particles is 20 mass % or less, 15 mass % or less is more preferable, and 10 mass % or less is still more preferable. By the content of the polymer particles being 20 mass % or less, the clogging properties when the printer is left tend to further improve.

It is preferable that the average particle diameter of the polymer particle is approximately 10 nm or more to 100 nm or less and 10 nm or more to 80 nm or less is more preferable. By the average particle diameter of the polymer particles being comparatively small, characteristics such as an ease of imparting glossiness of the recorded image, and excellent film forming properties are exhibited. By the average particle diameter of the polymer particles being comparatively small, since it is difficult for large lumps to form even if aggregation occurs, it is possible for clogging of the nozzles to be suppressed. By the average particle diameter of the polymer particles being small, it is possible for the viscosity of the ink composition to be comparatively increased, and even if the temperature of the ink composition in the recording head rises, it is possible for lowering of the viscosity to such an extent that the ink discharge properties become unstable to be avoided. The average particle diameter, as long as not specifically indicated, is the volumetric based. As the measurement method, it is possible to perform measurement with a particle size distribution analyzer in which a laser diffraction scattering method is the measurement principle. Examples of the particle size distribution analyzer include a particle size distribution meter (for example, Microtrac UPA manufactured by Nikkiso Co., Ltd.) in which dynamic light scattering is the measurement principle.

Core Polymer

It is preferable that the glass-transition temperature of the polymer that configures the core portion is −10° C. or higher to 60° C. or lower. By the glass-transition temperature of the core polymer being 60° C. or lower, because it is possible for the core polymer to easily flow out after the shell polymer is softened, the adhesiveness is excellent. By the glass-transition temperature of the core polymer being −10° C. or higher, the storage stability of the ink composition is excellent. It is preferable that the glass-transition temperature of the core polymer is 25° C. or higher and less than 60° C., and 30° C. or higher to 55° C. or lower is more preferable.

In a case where the polymer that configures the core polymer is a homopolymer, it is possible to use one in which the Tg of the homopolymer is disclosed in various documents (for example, a polymer handbook or the like). In a case where the polymer that configures the core polymer is a co-polymer, it is possible to calculate the Tg of the core polymer from the $Tg_n$ (unit: K) of the various homopolymers and the mass fraction ($W_n$) of the monomer using the FOX formula below.

$$\frac{1}{Tg} = \frac{W_1}{Tg_1} + \frac{W_2}{Tg_2} + \ldots + \frac{W_n}{Tg_n} \qquad \text{[Equation 1]}$$

$W_n$: mass fraction of each monomer
$Tg_n$: Tg of homopolymer of each monomer (unit: K)
Tg: Tg of the copolymer (unit: K)

Although not particularly limited, examples of the homopolymer include 2-ethylhexyl acrylate homopolymer (Tg: −70° C.), 2-ethylhexyl methacrylate homopolymer (Tg: −10° C.), 2-hydroxyethyl acrylate homopolymer (Tg: −15° C.), 2-hydroxyethyl methacrylate homopolymer (Tg: 55° C.), 2-hydroxy-butyl acrylate homopolymer (Tg: −7° C.), 2-hydroxy-butyl methacrylate homopolymer (Tg: 26° C.), 2-methoxyethyl acrylate homopolymer (Tg: −50° C.), 4-hydroxybutyl acrylate homopolymer (Tg: −80° C.), iso-octyl methacrylate homopolymer (Tg: −45° C.), iso-butyl acrylate homopolymer (Tg: 43° C.), iso-butyl methacrylate homopolymer (Tg: 53° C.), iso-propyl acrylate homopolymer (Tg: −3° C.), iso-propyl methacrylate homopolymer (Tg: 81° C.), N, N-diethylaminoethyl methacrylate homopolymer (Tg: 20° C.), N, N-dimethylaminoethyl acrylate homopolymer (Tg: 18° C.), N, N-dimethylaminoethyl methacrylate homopolymer (Tg: 18° C.), N, N-dimethylaminopropyl acrylamide homopolymer (Tg: 134° C.), n-butyl acrylate homopolymer (Tg: −54° C.), tert-butyl acrylate homopolymer (Tg: 43° C.), tert-butyl methacrylate homopolymer (Tg: 20° C.), acrylamide homopolymer (Tg: 179° C.), acrylic acid homopolymer (Tg: 106° C.), acrylonitrile homopolymer (Tg: 125° C.), isoamyl acrylate homopolymer (Tg: −45° C.), isobutyl acrylate homopolymer (Tg: −26° C.), isobutyl methacrylate homopolymer (Tg: 48° C.), isobornyl acrylate homopolymer (Tg: 94° C.), isobornyl methacrylate homopolymer (Tg: 155° C. to 180° C.), itaconic acid homopolymer (Tg: 100° C.), ethyl acrylate homopolymer (Tg: −22° C. to −24° C.), ethylcarbitol acrylate homopolymer (Tg: −67° C.), ethyl methacrylate homopolymer (Tg: 65° C.), ethoxyethyl acrylate homopolymer (Tg: −50° C.), ethoxy ethyl methacrylate homopolymer (Tg: 15° C.), ethoxy diethylene glycol acrylate homopolymer (Tg: −70° C.), octyl acrylate homopolymer (Tg: −65° C.), iso-octyl acrylate homopolymer (Tg: −70° C.), cyclohexyl acrylate homopolymer (Tg: 15° C. to 19° C.), cyclohexyl methacrylate homopolymer (Tg: 66° C. to 83° C.), dicyclopentanyl acrylate homopolymer (Tg: 120° C.), dicyclopentanyl methacrylate homopolymer (Tg: 175° C.), styrene homopolymer (Tg: 100° C.), stearyl acrylate homopolymer (Tg: 35° C.), tertiary butyl acrylate homopolymer (Tg: 41° C.), tertiary butyl methacrylate homopolymer (Tg: 107° C.), tetradecyl acrylate homopolymer (Tg: 24° C.), tetradecyl methacrylate homopolymer (Tg: −72° C.), tetrahydrofurfuryl acrylate homopolymer (Tg: −12° C.), tetrahydrofurfuryl methacrylate homopolymer (Tg: 60° C.), nonyl acrylate homopolymer (Tg: 58° C.), phenoxyethyl acrylate homopolymer (Tg: −22° C.), phenoxy ethyl methacrylate homopolymer (Tg: 54° C.), butyl acrylate homopolymer (Tg: −56° C.), butyl methacrylate homopolymer (Tg: 20° C.), propyl acrylate homopolymer (Tg: 3° C.), propyl methacrylate homopolymer (Tg: 35° C.), hexadecyl acrylate homopolymer (Tg: 35° C.), hexadecyl methacrylate homopolymer (Tg: 15° C.), hexyl acrylate homopolymer (Tg: −57° C.), hexyl methacrylate homopolymer (Tg: −5° C., benzyl acrylate homopolymer (Tg: 6° C.), benzyl methacrylate homopolymer (Tg: 54° C.), pentyl acrylate homopolymer (Tg: 22° C.), pentyl methacrylate homopolymer (Tg: −5° C.), maleic acid homopolymer (Tg: 130° C.), methacrylic acid homopolymer (Tg: 185° C.), carboxyethyl acrylate homopolymer (Tg: 37° C.), methyl acrylate homopolymer (Tg: 8° C.), methyl methacrylate homopolymer (Tg: 105° C.), methoxyethyl acrylate homopolymer (Tg: −50° C.), methoxy methacrylate homopolymer (Tg: −16° C.), lauryl acrylate homopolymer (Tg: 10° C.), lauryl methacrylate homopolymer (Tg: −65° C.), and vinyl acetate homopolymer (Tg: 32° C.). Because there are cases where the Tg differs according to the method of manufacturing or the stereoregularity of the homopolymer, there is no limitation to the above.

It is possible to control the Tg of the polymer that configures the core polymer by selecting the homopolymer in cases where the polymer is a homopolymer. In cases where the polymer is a copolymer, control is possible by taking the Tg of the homopolymer and the FOX formula above into consideration.

Although not particularly limited, preferable examples of the polymer that configures the core polymer include polymers having at least a hydrophilic (meth)acrylate monomer unit, a hydrophobic (meth)acrylate monomer unit having an alkyl group with 3 or more carbon atoms, a hydrophobic (meth)acrylate monomer unit having a ring structure, a (meth)acrylamide monomer unit or an N-substituted derivative thereof, an aromatic vinyl compound monomer unit, and a carboxylic acid monomer unit. Among these, a hydrophobic (meth)acrylate having an alkyl group with 3 or more carbon atoms and a polymer having an aromatic vinyl compound are preferable.

Although not particularly limited, examples of the hydrophilic (meth)acrylate monomer include methyl (meth)acrylate, ethyl (meth)acrylate, α-hydroxymethyl (meth)acrylate, 2-hydroxyethyl (meth)acrylate, (poly) ethylene glycol (meth)acrylate, methoxy (poly) ethylene glycol (meth)acrylate, ethoxy (poly) ethylene glycol (meth)acrylate, and (poly) propylene glycol (meth)acrylate. Among these, methyl (meth)acrylate and ethyl (meth)acrylate are preferable. Here, the wording "hydrophilic" indicates the solubility with respect to 100 mL of water (20° C.) is 0.3 g or more.

Although not particularly limited, examples of the hydrophobic(meth)acrylate monomer having an alkyl group with or more carbon atoms include (meth)acrylates having an alkyl group with 3 or more carbon atoms such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, neopentyl (meth)acrylate, and behenyl (meth)acrylate. Among these, lauryl (meth)acrylate is preferable. Here, the wording "hydrophobic" indicates the solubility with respect to 100 mL of water (20° C.) is less than 0.3 g.

Although not particularly limited, examples of the hydrophobic (meth)acrylate monomer having a ring structure include cyclohexyl (meth)acrylate, dicyclopentanyl (meth)acrylate, dicyclopentanyl (meth)acrylate, dicyclopentanyl oxyethyl (meth)acrylate, isobornyl (meth)acrylate, norbornyl (meth)acrylate, adamantyl (meth)acrylate, and tetrahydrofurfuryl (meth)acrylate.

Although not particularly limited, examples of the (meth)acrylamide monomer or N-substituted derivatives thereof include (meth)acrylamide, N-hydroxymethyl(meth)acrylamide, diacetone acrylamide, N,N-dimethyl(meth)acrylamide, and the like.

Although not particularly limited, examples of the aromatic vinyl compound monomer include styrene, α-methylstyrene, p-methylstyrene, vinyl toluene, chlorostyrene, and divinylbenzene.

Although not particularly limited, examples of the carboxylic acid monomer include (meth)acrylic acid, crotonic acid, maleic acid, fumaric acid, and itaconic acid. Among these, (meth)acrylic acid is preferable. Here, the wording "carboxylic acid monomer" refers to a polymerizable monomer having a carboxyl group and a polymerizable unsaturated group.

These monomers are preferably used singly, or two or more types are preferably used together.

It is preferable that the content of the hydrophobic monomer unit from all units that configure the polymer that configures the core polymer is 80 mass % or more, 90 mass % or more is more preferable, and 100 mass % is still more preferable. By the content of the hydrophobic monomer unit being in the above range, because a hydrophobic film is formed on the surface of the image recorded on the recording medium by performing heat treatment or the like, the abrasion resistance of the recording material tends to further improve.

Although not particularly limited, preferable examples of the polymer that configures the core polymer include polymers having only hydrophobic monomer units. By the polymer that configures the core polymer including a polymer having only hydrophobic monomer units, the abrasion resistance tends to further increase since a hydrophobic film is formed on the surface of the image recorded on the recording medium. Although not particularly limited, examples of hydrophobic monomer include a hydrophobic (meth)acrylate monomer having an alkyl group with 3 or more carbon atoms and a hydrophobic (meth)acrylate monomer having a ring structure.

It is preferable that the acid value of the polymer that configures the core polymer is 0 KOH/g to 30 KOH/g, 0 KOH/g to 10 KOH/g is more preferable, and 0 mgKOH/g is still more preferable. By the acid value of the polymer that configures the core polymer being 30 mgKOH/g or less, the abrasion resistance tends to further increase since a hydrophobic film is formed on the surface of the image recorded on the recording medium.

It is preferable to design the core polymer so as to be a polymer with a high hydrophobicity. Therefore, a core polymer without an acid value is most preferable. It is preferable that the core polymer includes at least an aromatic vinyl compound monomer as a constituent unit. In so doing, the core polymer becomes hydrophobic and it is possible to form a hydrophobic film. As a result, it is possible to improve the water and friction resistance that is one abrasion resistance in the recorded image.

Shell Polymer

The polymer that configures the shell polymer includes a polymer having a (meth)acrylate monomer unit and a carboxylic acid monomer unit. By the polymer that configures the shell polymer including a polymer having a (meth)acrylate monomer unit and a carboxylic acid monomer unit, it is possible for a carboxyl group to be present in the surface of the shell polymer. In so doing, the dispersion stability of the polymer particles further improves, and because the viscosity of the ink composition becomes comparatively low, the discharge stability further improves. Although not particularly limited, examples of the (meth)acrylate monomer unit include a hydrophilic (meth)acrylate monomer unit (for example, a (meth)acrylate monomer unit having a alkyl group with one or two carbon atoms), a hydrophobic (meth)acrylate monomer unit having an alkyl group with 3 or more carbon atoms, and a hydrophobic (meth)acrylate monomer unit having a ring structure. Specific examples of the (meth)acrylate monomer unit and the carboxylic acid monomer unit include the same ones described above for the monomer unit that configures the polymer that configures the core polymer. These monomers are preferably used singly, or two or more types are preferably used together.

It is preferable that the polymer that configures the shell polymer includes a polymer having a methyl (meth)acrylate monomer unit or an ethyl (meth)acrylate monomer unit. By including a polymer having a methyl (meth)acrylate monomer unit or ethyl (meth)acrylate monomer unit, the dispersion in water tends to be stable and recovery of the printer from clogging tends to further improve.

Although not particularly limited, examples of other polymers that configure the shell polymer include a polymers including at least one type selected from a group consisting of (meth)acrylamide monomer or an N-substituted derivative thereof, an aromatic vinyl, acrylic polyol, and cyanoacrylate.

It is preferable that the repeating unit derived from (meth)acrylic acid ester and unsaturated carboxylic acid from all the repeating units that configure the polymer included in the shell polymer is 20 mass % or more, 30 mass % or more is more preferable, and 35 mass % or more is still more preferable.

It is preferable that the repeating unit derived from a hydrophilic monomer from all the repeating units that configure the polymer included in the shell polymer is 20 mass % or more, 30 mass % or more is more preferable, and 35 mass % or more is still more preferable. By the content of the repeating unit derived from a hydrophilic monomer being in the above range, since the affinity of the polymer with respect to water improving, the dispersion stability of the polymer particles in the ink composition tends to improve. Since it is possible to more effectively suppress adhering of the polymer particles to the nozzle, the discharge stability from the nozzles of the recording head to be more favorable.

It is preferable that the repeating unit derived from a hydrophobic monomer from all the repeating units that configure the polymer included in the shell polymer is 10 mass % or more, 20 mass % or more is more preferable, and 30 mass % or more is still more preferable. By the content of the repeating unit derived from a hydrophobic monomer being in the above range, even in cases where the drying of the water increases and the occupancy ratio of the organic solvent increases in the recording head and on the recording medium, the dispersion of the polymer particles tends to be stable, and suppression of aggregation of the polymer particles to themselves tends to be possible. It is preferable that the hydrophobic monomer is an aromatic vinyl monomer.

It is preferable that the glass transition point of the polymer that configures the shell polymer is 40° C. or higher, 45° C. or higher is more preferable, and 50° C. or higher is still more preferable. By the glass transition point of the polymer that configures the shell polymer being 40° C. or higher, it is possible to discharge the polymer particles from the recording head without the core-shell structure further collapsing, and because it is possible for attachment of the polymer particles in the recording nozzles to be further suppressed, the discharge stability tends to be superior. The polymer that configures the shell polymer is preferably a homopolymer or is preferably a copolymer. It is preferable that the glass transition point of the polymer that configures the shell polymer is 100° C. or lower, 90° C. or lower is more preferable, and 80° C. or lower is still more preferable. By the glass-transition temperature of the core polymer being 90° C. or lower, because the shell polymer is easily softened on the recording medium and the core polymer easily flows out, the adhesiveness tends to be superior. In a case where the polymer that configures the shell polymer is a homopolymer, it is possible to use one in which the Tg of the homopolymer is disclosed in various documents (for example, a polymer handbook or the like). In a case where the polymer that configures the shell polymer is a co-polymer, it is possible to calculate the Tg of the co-polymer from the $Tg_n$ (unit: K) of the various homopolymers and the mass fraction ($W_n$) of the monomer using the FOX formula below.

It is preferable that the acid value of the polymer that configures the shell polymer is 20 to 400 mgKOH/g, 30 to 200 mgKOH/g is more preferable, and 50 mgKOH/g to 150 mgKOH/g is still more preferable. By the acid value of the polymer that configures the shell polymer being 20 mgKOH/g or more, since a hydration layer is easily formed around the shell polymer, the dispersion stability of the polymer particles in the ink composition tends to improve. Since it is possible to more effectively suppress adhering of the polymer particles to the nozzle, the discharge stability from the nozzles of the recording head to be more favorable. By the acid value of the polymer that configures the shell polymer being 400 mgKOH/g or less, the abrasion resistance tends to further improve. In a case of the polymer that configures the core polymer or the shell polymer includes two or more polymers, the acid value is obtained from the measured values thereof.

The polymer that configures the core polymer or the shell polymer is preferably used singly, or two kinds or more are preferably used together. In a case of two or more types of polymer that configures the core polymer, the glass-transition temperature of the polymer having the lowest glass-transition temperature is the "glass-transition temperature of the polymer that configures the core polymer". In a case of two or more types of polymer that configures the shell polymer, the glass-transition temperature of the polymer having the lowest glass-transition temperature is the "glass-transition temperature of the polymer that configures the shell polymer".

In the core-shell polymer particles in the specification, the polymer that forms the core polymer is preferably delocalized on the core portion and the polymer that forms the shell polymer is preferably delocalized on the shell portion, and the polymer particles preferably do not have a strict boundary between the core portion and the shell portion.

It is particularly preferable that the polymers that configure the core polymer and shell polymer of the polymer particles are each non-crosslinked. By being non-crosslinked, the discharge stability tends to further improve. It is possible for the crosslinking degree of the polymer to be quantified by measuring the gel fraction (below, referred to as the "THF gel fraction") of the polymer using tetrahydrofuran (THF). It is preferable that the THF gel fractions of the polymer that configures the core polymer and the polymer that configures the shell polymer each independently are 10% or less and 5% or less is more preferable. By the THF gel fractions of the polymer that configures the core polymer and the polymer that configures the shell polymer being within the above range, the abrasion resistance of the image recorded on the recording medium tends to further improve.

It is possible for the THF gel fraction to be measured in the following manner. Approximately 10 g of the core-shell polymer particles is placed in a Teflon (registered trademark) Petri dish, and a film was formed by drying for 1 hour at 120° C. The obtained film is immersed for 24 hours at 20° C. and filtered with a 100 mesh filter, further dried for 24 hours at 20° C., and it is possible for the THF gel fraction (%) to be obtained from the following formula.

THF gel fraction (%)=(mass after re-drying/original mass) ×100

It is preferable that the polymer particles include 0.50 mass % to 20 mass % of the specified polymer particles with a mass ratio (c/s) of the mass (c) core polymer and the mass (s) of the shell polymer of 0.40 to 4.0 with respect to the total amount of the polymer particles and a ratio ((c/s)/φ) of the average particle diameter φ (unit: nm) of the polymer particles and the mass ratio (c/s) of 0.010 or more. By using such polymer particles, the discharge stability of the ink composition and the abrasion resistance of the image recorded on the recording medium both tend to improve.

In the polymer particles with 0.5 mass % to 20 mass % with respect to the total amount of the polymer particles, it is preferable that the mass ratio (c/s) of the mass of the core polymer (c) and the mass (s) of the shell polymer is 0.40 to 4.0, 0.5 to 2.5 is more preferable, and 1.0 to 2.5 is still more preferable. By the mass ratio (c/s) being within the above range, because the balance of the mass of the core polymer and the mass of the shell polymer is favorable, the discharge stability of the ink composition and the abrasion resistance of the image recorded on the recording medium both tend to improve.

It is preferable that ratio ((c/s)/φ) of the average particle diameter φ (unit: nm) of the polymer particles and the mass ratio (c/s) is 0.010 or more, 0.020 to 1.00 is more preferable, and 0.03 to 0.070 is still more preferable. By the ratio ((c/s)/φ) being within the above range, because the balance of the mass of the core polymer and the mass of the shell polymer is favorable regardless of the size of the polymer particles, the discharge stability of the ink composition and the abrasion resistance of the image recorded on the recording medium both tend to improve.

Method of Synthesizing Polymer Particles

Although the method of synthesizing the polymer particles is not particularly limited, it is possible for the particles to be easily synthesized using known emulsion polymerization method or an appropriate combination thereof. Specifically, examples thereof include a batch mixing polymerization method, a monomer dropping method, a pre-emulsion method, a seed emulsion polymerization method, a multi-stage emulsion polymerization method (such as a two stage emulsion polymerization method), and an inverse emulsion polymerization method. From the viewpoint of the capability making the average particle diameter of the polymer particles minute, an emulsifier free polymerization method is preferable.

A polymerization method in which the core polymer is synthesized first will be described. First, the core particles are synthesized with an ordinary emulsion polymerization method using an aqueous medium. Although the conditions of emulsion polymerization preferably conform to known methods, in the case where the total amount of monomer used is 100 parts, it is ordinarily possible for polymerization to be performed using 100 to 500 parts of water (aqueous medium). It is preferable that the polymerization temperature is −10° C. to 100° C., −5° C. to 100° C. is more preferable, and 0° C. to 90° C. is still more preferable. It is preferable that the polymerization time is 0.1 to 30 hours, and 2 to 25 hours is more preferable. It is possible to use a batch method that incorporates the monomers as a batch, a method that dividedly or continuously supplies the monomer, a method that dividedly or continuously adds the pre-emulsion of the monomer, or a method that stepwise combines these methods as the method of emulsion polymerization. It is possible to use, as necessary, one or two or more types of a polymerization initiator, a molecular weight regulator, an emulsifying agent and the like used in ordinary emulsion polymerization.

Although the polymerization initiator is not particularly limited, it is possible to use a redox system in which persulfates such as potassium persulfate and ammonium persulfate; organic peroxides such as diisopropyl peroxydicarbonate, benzoyl peroxide, lauroyl peroxide, and tert-butyl peroxy-2-ethyl hexanoate; azo compounds such as azobisisobutyronitrile, dimethyl-2,2'-azobisisobutyrate and 2-carbamoyl-aza isobutyronitrile; radical emulsifiers having a peroxide group, sodium bisulfite, and a reducing agent such as ferrous sulfate are combined. The polymerization initiator is preferably used singly, or two kinds or more are preferably used together.

Although not particularly limited, examples of the molecular weight regulator include mercaptans such as n-hexyl mercaptan, n-octyl mercaptan, n-dodecyl mercaptan, t-dodecyl mercaptan, n-hexadecyl mercaptan, n-tetradecyl mercaptan, t-tetradecyl mercaptan, and thioglycolic acid; xanthogen disulfides such as dimethyl xanthogen disulfide, diethyl xanthogen disulfide, and diisopropyl xanthogen disulfide; thiuram disulfides such as tetramethyl thiuram disulfide, tetraethyl thiuram disulfide, and tetra-butyl disulfide; halogenated hydrocarbons such as chloroform, carbon tetrachloride, carbon tetrabromide, and ethylene bromide; hydrocarbons such as pentaphenyl ethane, and α-methyl styrene dimer; acrolein, methacrolein, allyl alcohol, 2-ethylhexyl thioglycolate, terpinolene, α-terunepin, γ-terunepin, dipentene, and 1,1-diphenyl ethylene. The molecular weight regulator is preferably used singly, or two kinds or more are preferably used in combination.

Although not particularly limited, examples of the emulsifier include anionic surfactants such as alkylsulfuric acid ester salt, and alkylbenzene sulfonic acid salts; nonionic surfactants such as alkyl esters of polyethylene glycol, alkyl ethers of polyethylene glycols, alkyl phenyl ethers of polyethylene glycol; reactive emulsifiers having a hydrophilic group, a hydrophobic group, and a radical reactive group; vinyl-based polymers, and polymeric emulsifiers to which a hydrophilic group is introduced to polymer such as polyester-based polymers. The emulsifiers are preferably used singly, or two or more types are preferably used together. The wording "hydrophilic group" is an atomic group with a high affinity with respect to water, and examples include a nitro group, a hydroxyl group, an amino group, a carboxyl group, and a sulfonate group. The wording "hydrophobic group" is an atomic group with a lower affinity with respect to water than the hydrophilic group, and examples include a linear or branched alkyl group, an alicyclic group, an aromatic ring group, an alkylsilyl group, and a perfluoroalkyl group.

Next, the monomer for the shell polymer is polymerized in the presence of the obtained core particles (core polymer). Specifically, it is possible to form the core-shell polymer particles by seed polymerizing the monomer for the shell polymer in a state in which the obtained core particles are used as the seed particles. The monomer for the shell polymer or the pre-emulsion thereof is preferably added dropwise in a batch, divided, or continuously to the aqueous medium in which the core particles are dispersed. It is preferable that the amount of the core particles used at the time is 25 parts by mass to 250 parts by mass with respect to 100 parts by mass of the monomer for the shell polymer. In a case of using the polymerization initiator, the molecular weight regulator, the emulsifier and the like when polymerizing, it is possible for the same one as during the manufacturing of the core particles to be used. The conditions such as the polymerization time are preferably the same as the manufacturing time of the core particles.

A polymerization method in which the shell polymer is synthesized first will be described. First, the shell polymer is synthesized. Specifically, a pre-emulsion solution including the above-described hydrophilic monomer is prepared using the reactive emulsifier, the pre-emulsion solution is added dropwise to the aqueous solution with the polymerization initiator, and the shell polymer is synthesized with the polymerization reaction.

Next, the obtained shell polymer is polymerized, the core polymer is polymerized, thereby synthesizing the polymer particles according to the embodiment. Specifically the monomer mixture that includes the above-described hydrophobic monomer is added dropwise to the aqueous dispersion medium containing the shell polymer, and the core polymer is polymerized, thereby forming the polymer particles. In a case of polymerizing the shell polymer, it is not necessary that the emulsifying be contained in the monomer mixture, and it is possible for the emulsifier to be added dropwise as monomer oil droplets.

According to the multi-stage emulsion polymerization method, because the shell polymer is synthesized using the reaction emulsifier, and emulsion free synthesis of the core polymer is possible, it is possible for the content of the emulsifier in the ink composition to be easily made 0.01 mass % or less. When the content of the contained emulsifier is 0.01 mass % or less in the ink composition, aggregation of the ink components at the ink interface (gas-liquid interface at the atmosphere-ink, solid-liquid interface at ink contact member-ink such as an ink accommodation container) is suppressed and the storage stability is excellent, and thus, is preferable. When the content of the contained emulsifier is 0.01 mass % or less in the ink composition, because the foamability and defoaming are excellent, it is possible to preferably use and ink accommodation container having a fill port able to be filled with ink. The wording "ink accommodation container having a fill port able to be filled with ink" indicates an ink accommodation container having a fill port that is detachable or openable and closable, and while a user is able to easily pour in the ink composition, foaming easily arises during pouring. The ink composition is easily filled when the opening area of the fill port is 20 $mm^2$ or more, and thus, is preferable. Such an ink accommodation container is disclosed in JP-A-2005-219483 or JPA-2012-51309.

Even in a case of synthesizing the polymer particles using a large amount of emulsifier, the content of the emulsifier contained in the ink composition is preferably made 0.01 mass % or less by removing excess emulsifier after synthesizing the polymer particles.

Finally, by adjusting the pH by neutralizing with bases such as sodium hydroxide, potassium hydroxide, and ammonia, and filtering, as necessary, the core-shell polymer particle dispersion liquid is obtained.

Polar Solvent with Boiling Point of 150° C. or Higher

The ink composition according to the embodiment includes a polar solvent with a boiling point of 150° C. or higher. By including a polar solvent with a boiling point of 150° C. or higher, the abrasion resistance of the obtained recording material and the clogging recovery in the case of using ink jet nozzles are further improved. Although the polar solvent is preferably either aprotic or protic, a protic polar solvent is preferable. Although not particularly limited, examples of the polar solvent with a boiling point of 150° C. or higher include 1,2-propanediol, 1,2-butanediol, 1,2-hexane diol, 1,2-pentanediol, 1,3-propanediol, 1,3-butanediol, 1,4-butanediol, 1,5-pentane diol, 1,6-hexane diol, 1,7-heptane diol, 1,8-octane diol, 2-ethyl-1,3-hexane diol, 2-butene-1,4-diol, 2-methyl-2,4-pentanediol, 3-methyl-3-methoxy-butanol, 3-methoxy-butanol, iso-butylene glycol, ethylene glycol, ethylene glycol mono-2-ethylhexyl ether, ethylene glycol mono-t-butyl ether, ethylene glycol mono phenyl ether, ethylene glycol mono ethyl ether, ethylene glycol monobutyl ether, ethylene glycol mono-propyl ether, ethylene glycol mono-hexyl ether, ethylene glycol monomethyl ether, ethylene glycol monomethyl ether, glycerin, diethylene glycol, diethylene glycol mono-2-ethylhexyl ether, diethylene glycol mono-n-hexyl ether, diethylene glycol mono-t-butyl ether, diethylene glycol mono ethyl ether, diethylene glycol monobutyl ether, diethylene glycol monopropyl ether, diethylene glycol monomethyl ether, dipropylene glycol, dipropylene glycol monoethyl ether, dipropylene glycol monomethyl ether, dipropylene glycol mono-propyl ether, dipropylene glycol monomethyl ether, triethylene glycol, triethylene glycol monobutyl ether, triethylene glycol monomethyl ether, tripropylene glycol, tripropylene glycol monomethyl ether, propylene glycol, propylene glycol mono-propyl ether, propylene glycol monobutyl ether, propylene glycol mono ethyl ether, and propylene glycol monomethyl ether.

The wording "boiling point" in the specification indicates the standard boiling point at one atmosphere.

These polar solvents with a boiling point of 150° C. or higher are preferably used singly or two kinds or more are preferably used in combination.

It is preferable that the content of the polar solvent with a boiling point of 150° C. or higher is 10 mass % to 40 mass % with respect to the total amount of the ink composition, 15 mass % to 35 mass % is more preferable, and 20 mass % to 25 mass % is still more preferable. By the content of the polar solvent with a boiling point of 150° C. or higher being 10 mass % to 40 mass %, the abrasion resistance and the aggregation unevenness of the obtained recording material improve, and the clogging recovery further improves.

It is preferable that the polar solvent with a boiling point of 150° C. or higher includes a polar solvent with a boiling point of 190° C. or higher to 220° C. or lower. Although not particularly limited, examples of the polar solvent with a boiling point of 190° C. or higher to 220° C. or lower include 1,2-butane diol, 1,3-propane diol, 1,3-butane diol, 2-methyl-2,4-pentane diol, ethylene glycol, ethylene glycol monohexyl ether, diethylene glycol monopropyl ether, diethylene glycol monomethyl ether, diethylene glycol mono ethyl ether, dipropylene glycol propyl ether, and dipropylene glycol mono propyl ether.

It is preferable that the content of the polar solvent with a boiling point of 190° C. or higher and 220° C. or lower is 5.0 mass % or more with respect to the total amount of the ink composition, and 7.5 mass % or more is more preferable. Although the upper limit of the content of the polar solvent with a boiling point of 190° C. or higher to 220° C. or lower is not particularly limited, 40 mass % or less is preferable. By the content of the polar solvent with a boiling point of 190° C. or higher to 220° C. or lower being 5.0 mass % or more, the abrasion resistance and the aggregation unevenness of the obtained recording material tend to improve, and the clogging recovery tends to further improve.

It is preferable that the content of the polar solvent with a boiling point of 260° C. or higher in the polar solvent with a boiling point of 150° C. or higher is 5.0 mass % or less with respect to the total amount of the ink composition, and 2.5 mass % or less is more preferable. Although the lower limit of the content of the polar solvent with a boiling point of 260° C. or higher is not particularly limited, 0 mass % or more is preferable, that is, the polar solvent is preferably not included. By the content of the polar solvent with a boiling point of 260° C. or higher being 5.0 mass % or less, the abrasion resistance and the aggregation unevenness of the obtained recording material tend to further improve.

Although not particularly limited, examples of the polar solvent with a boiling point of 260° C. or higher include glycerin, diethyleneglycol mono-n-hexyl ether, triethylene glycol monobutyl ether, glycerin, diethyleneglycol mono-2-ethyl hexylether, triethylene glycol, tripropylene glycol, and tetraethylene glycol.

It is preferable that the polar solvent with a boiling point of 150° C. or higher includes a nitrogen-containing solvent. By including the nitrogen-containing solvent, because the stability of the polymer particles is further improved and it is possible to effectively prevent precipitation of foreign substances in the ink composition, the storage stability, particularly in high temperatures, tends to be superior.

Among the nitrogen-containing solvents, because of having a moisturizing capability, it is possible to prevent the polymer particles and other components from aggregating and solidifying due to the water content evaporating during storage of the ink composition. In so doing, clogging in the vicinity of the nozzles of the head during ink jet recording is prevented, and the discharge stability of the ink composition tends to be superior. There is an effect of promoting the softening of the polymer particles, and the adhesiveness tends to improve even in a case of a low heating temperature.

Although not particularly limited, examples of the nitrogen-containing solvent include pyrrolidones, imidazolidinones, amide ethers, pyridines, pyrazines, and pyridones. Pyrrolidones are preferable, and examples include 2-pyrrolidone, N-methyl-2-pyrrolidone, and N-ethyl-2-pyrrolidone. The nitrogen-containing solvent is preferably used singly, or two or more types are preferably used together.

It is preferable that the content of the nitrogen-containing solvent is 5.0 mass % or more with respect to the total amount of the ink composition, and 7.5 mass % or more is more preferable. Although the upper limit of the content of the nitrogen-containing solvent is not particularly limited, 20 mass % or less is preferable. By the content of the nitrogen-containing solvent being 5.0 mass % or more, the aggregation unevenness tends to further improve.

Water

The ink composition according to the embodiment includes water. It is possible for pure waters, such as ion-exchange water, ultrafiltered water, reverse osmosis water, and distilled water or ultrapure water to be used as the water, without being particularly limited. By including the water, it is possible to reduce the organic solvent, and, as a result, it is possible to make an environmentally conscious ink composition.

It is preferable that content of the water is 50 mass % to 80 mass % with respect to the total amount of the ink composition. By the content of the water being within this range, the discharge stability and adhesiveness tend to further improve.

Surfactant

It is preferable that the ink composition according to the embodiment includes a surfactant. Although not particularly limited, examples of the surfactant include acetylene glycol-based surfactants, fluorine based surfactants, and silicone based surfactants. By the ink composition including these surfactants, the wettability of the ink composition attached to the recording medium tends to further improve.

Although not particularly limited, it is preferable that the acetylene glycol-based surfactant is at least one type selected from alkylene oxide adducts of 2,4,7,9-tetramethyl-5-decyne-4,7-diol, and 2,4,7,9-tetramethyl-5-decyne-4,7-diol, and alkylene oxide adducts of 2,4-dimethyl-5-decyne-4-ol and 2,4-dimethyl-5-decyne-4-ol. Although not particularly limited, examples of commercially available fluorine based surfactants include the Olefin (registered trademark) 104 series, or E series, such as Olefin E1010 (manufactured by Air Products), and Surfynol (registered trademark) 465, Surfynol 61 and Surfynol DF110D (manufactured by Nissin Chemical Industry Co., Ltd.). The acetylene glycol-based surfactant is preferably used individually, or two or more types are preferably used together.

Although not particularly limited, examples of the fluorine-based surfactant include perfluoroalkylsulfonates, perfluoroalkylcarboxylates, perfluoroalkylphosphoric acid esters, perfluoroalkylethylene oxide adducts, perfluoroalkylbetaines, and perfluoroalkylamine oxide compounds. Although not particularly limited, examples of commercially available fluorine-based surfactants include 5-144 and S-145 (manufactured by Asahi Glass), FC-170C, FC-430, and Fluorad FC4430 (manufactured by Sumitomo 3M Limited), FSO, FSO-100, FSN, FSN-100, and FS-300 (manufactured by Dupont), and FT-250 and 251 (manufactured by Neos Company Limited). These fluorine-based surfactants are preferably used independently or two or more types are preferably used in combination.

Examples of the silicone-based surfactant include polysiloxane-based compounds and polyether-modified organosiloxanes. Although not particularly limited, examples of commercially available silicone-based surfactants include BYK-306, BYK-307, BYK-333, BYK-341, BYK-345, BYK-346, BYK-347, BYK-348 and BYK-349 (all product names, manufactured by BYK-Chemie Japan Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all product names, manufactured by Shin-Etsu Chemical Co., Ltd.).

It is preferable that the content amount of the surfactant in the ink composition is 0.1 mass % to 5.0 mass % with respect to the total amount of the ink composition, and 0.1 mass % to 3.0 mass % is more preferable. By the content of the surfactant being within this range, the wettability of the ink composition attached to the recording medium tends to further improve.

Resin Emulsion

The ink composition according to the embodiment preferably further contains a resin emulsion. By using the resin emulsion, because the pigment is fastened to the recording medium by the resin within the resin emulsion, and the resin and the pigment fusing to one another along with the drying of the ink, it is possible for the abrasion resistance and the adhesiveness of the image parts of the recording material to be much improved. Among these resin emulsions, urethane resin emulsions and acrylic resin emulsions are preferable.

The urethane resin is not particularly limited as long as the resin emulsion has a urethane bond in the molecule, and examples thereof include a polyether urethane resin including an ether bond in the main chain thereof, a polyester-type urethane resin including an ester bond in the main chain thereof, and a polycarbonate urethane resin including a polycarbonate bond in the main chain thereof.

Although not particularly limited, examples of the acrylic resin emulsion include those in which (meth)acrylic monomers, such as (meth)acrylic acid and (meth)acrylic acid ester, are polymerized, and those in which a (meth)acrylic monomer and another monomer are co-polymerized.

Among these, at least one type selected from a group consisting of a (meth)acrylic resin and a styrene-(meth) acrylate copolymer-based resin is preferable, at least one type selected from a group consisting of an acrylic resin and a styrene-acrylate copolymer-based resin is more preferable, and a styrene-acrylate copolymer-based resin is still more preferable. The above copolymers preferably have the form of any of random copolymers, block copolymers, alternating copolymers, and graft copolymers.

These resins are preferably used singly, or two or more types are preferably used in combination.

It is preferable that the content of the resin emulsion is 3 mass % to 10 mass % with respect to the total amount of the ink composition, and 3 mass % to 5 mass % is more preferable. By being within the above ranges, the adhesiveness and the abrasion resistance of the recording material tend to further improve, and the long-term storage stability of the ink tends to be superior and the viscosity of the ink in particular tends to be able to be lowered.

pH adjuster

The ink composition according to the embodiment preferably further includes a pH adjuster. By using the pH adjuster, it is possible to make the pH basic, it is possible for the attack properties on the ink jet head to be mitigated. Although not particularly limited, examples of the pH adjuster include triethanol amine.

Other Components

In order to favorably maintain the storage stability of the ink composition and the discharge stability from the head, in order to improve clogging, or in order to prevent deterioration in the ink composition, it is possible to add, as appropriate, various additives such as solvents, moisturizing agents, dissolution aids, viscosity adjusters, antioxidants, antifungal agents, preservatives, anti-corrosive agents and chelating agents for trapping metal ions that influence the dispersion.

Surface Tension

It is preferable that the surface tension of the ink composition at 25° C. is 20 to 50 mN/m, and 20 to 40 mN/m is more preferable. By the surface tension being within this range, the discharge stability tends to be favorable. It is possible for the surface tension to be measured using a surface tension meter based on the Wilhelmy method.

Viscosity

It is preferable that the viscosity of the ink composition at 20° C. is 4.5 mPa·s or more, and 5.0 mPa·s or more is more preferable. Although the upper limit of the viscosity of the ink composition at 20° C. is not particularly limited, 20 mPa·s or lower is preferable. By the viscosity being within this range, the discharge stability tends to be favorable. It is possible to measure the viscosity to be measured using a viscometer.

It is preferable that the viscosity of the ink composition at 50° C. is 2 mPa·s to 4 mPa·s, and 2.1 mPa·s to 3.5 mPa·s is more preferable. By the viscosity being within this range, the discharge stability tends to be favorable. It is possible to measure the viscosity to be measured using a viscometer.

It is preferable that the viscosity reduction rate from the viscosity at 20° C. to the viscosity at 50° C. is 40% to 80%, and 60% to 80% is more preferable. Since there is a tendency for the viscosity of the ink composition to become lower because of also being directly or indirectly heated inside the head during recording, by the viscosity reduction rate being within this range, the discharge stability tends to be more favorable. Because it is possible to suppress a rise in the viscosity by the ink composition of the embodiment using the polymer particles, it is possible to improve the lower of the drying properties due to using a large amount of the polar solvent with a high boiling point. The viscosity reduction rate from the viscosity at 20° C. to the viscosity at 50° C. is represented by the formula (A) below, and can be controlled by a combination of additives to the ink.

$$\text{(viscosity reduction rate from viscosity at 20° C. to viscosity at 50° C.)} = ((\text{viscosity at 20° C.}) - (\text{viscosity at 50° C.})) / (\text{viscosity at 20° C.}) \times 100 \quad (A)$$

(Recording Medium)

Examples of the recording medium include an absorbent recording medium, a low absorbency recording medium, or a non-absorbent recording medium. It is preferable that a recording medium is used that is pre-heated before the ink composition is attached or heated during attachment. By performing recording on a heated non-absorbent recording medium or a low absorbency recording medium using the ink composition of the embodiment, it is possible to soften the shell polymer when the ink composition is attached to the recording medium and to form a film with excellent abrasion resistance. Because the recording medium is preferably heated, the nozzles are preferably not heated, as necessary, in order for the viscosity of the ink composition to be lowered. In so doing, it is possible to prevent fusing of the components, such as the polymer, in the ink composition on the inner wall of the nozzle, and the clogging recovery becomes excellent. It is preferable that the surface temperature of the recording medium during heating is 30° C. to 70° C., and 40° C. to 60° C. is more preferable.

Although not particularly limited, examples of the absorbent medium include ordinary paper, such as an electrophotographic paper with a high permeability of ink and ink jet paper (specialized ink jet paper provided with an ink absorbency layer configured from silica particles or alumina particles or an ink absorbency layer configured from a hydrophilic polymer, such as polyvinyl alcohol (PVA) or polyvinyl pyrrolidone (PVP)).

Although not particularly limited, examples of the low absorbency recording medium include coated papers provided with a coating layer for receiving an oil based ink composition on the surface thereof. Although not particularly limited, examples of the coated paper include recording book papers, such as art paper, coated papers, and matte papers.

Although not particularly limited, examples of the non-absorbent recording medium include films or plates of plastics such as polyvinyl chloride, polyethylene, polypropylene, and polyethylene terephthalate (PET), plates of metals such as iron, silver, copper and aluminum, or metal plates or plastic films manufactured by deposition of these various metals, or alloy plates such as stainless steel or brass.

The terms "low absorbency recording medium" and "non-absorbent recording medium" refer to a recording medium with a water absorption amount from the start of contact up to 30 msec being 10 mL/m$^2$ or less in the Bristow method. The Bristow method is the most widespread method used as a method of measuring a liquid absorption amount in a short time, and is also employed by the Japan Technical Association of the Pulp and Paper Industry (JAPAN TAPPI). The details of the testing method are disclosed in the standard No. 51 "Paper and Cardboard-Liquid Absorbency Test Method-Bristow Method" of the "JAPAN TAPPI Paper Pulp Test Method 2000 Edition".

In addition, non-absorbent or low absorbency recording media may be classified according to wettability with respect to water on the recording surface. For example, it is possible to characterize recording media by adding a 0.5 μL water droplet onto the recording surface of the recording medium and measuring the rate of decrease in the contact angle (comparison of the contact angle 0.5 ms and the contact angle at 5 sec. after landing). More specifically, the wording non-absorbent in "non-absorbent recording medium" indicates that the above-described lowering rate is less than 1%, and low absorbency in "low absorbency recording medium" indicates that the lowering rate is 1% or higher to less than 5%. "Absorbent" indicates a lowering rate of 5% or more. It is possible for the contact angle to be measured using a portable contact angle meter PCA-1 (manufactured by Kyowa Kaimen Kagaku), or the like.

Ink Jet Recording Method

The recording method of the embodiment includes a first heating step that heats surface temperature of a recording medium to 30° C. to 70° C.; an attachment step that discharges the ink composition from a nozzle, and attaches the ink composition on the heated recording medium; and a second heating step that heats the recording medium to which the ink composition is attached to 40° C. to 120° C.

FIGURE is a schematic cross-sectional view showing an example of a recording apparatus used in the embodiment. As shown in FIGURE, the recording apparatus 1 is provided with a recording head 2, an IR heater 3, a platen heater 4, a curing heater 5, a cooling fan 6, a pre-heater 7 and an airflow fan 8.

First Heating Step

The first heating step is a step of heating the surface temperature of the recording medium before the ink composition is attached to 30° C. to 70° C. It is possible for the heating step to be performed by the IR heater 3, the platen heater 4 or the pre-heater 7. By heating the recording medium, the shell polymer of the polymer particles attached to the recording material is easily softened, and it is possible for a recording material with excellent abrasion resistance to be obtained. It is preferable that the surface temperature of the recording medium is 40° C. to 60° C. It is preferable that the surface temperature of the recording medium in this case is lower than the glass-transition temperature of the polymer included in the shell polymer. Thereby, it is possible to prevent the core-shell structure of the polymer particles in the printing head from collapsing due to the radiation heating of the recording medium.

Attachment Step

The attachment step is a step for discharging the ink composition from a nozzle and attaching the composition on the heated recording medium. It is possible to use methods known in the related art as the discharge unit (recording head 2) for the ink composition, and examples thereof include discharging liquid droplets using the vibration of a piezo-electric element, that is, forming ink droplets through mechanical deformation of an electrostrictive element.

By including the first heating step and the attachment step, it is possible to suppress the polymer particles from fusing in the recording head 2 without softening of the shell polymer of the polymer particles in the ink composition in the recording head 2, and the discharge stability is thereby improved.

It is preferable that the maximum impact amount of the ink composition in the attachment step is 16.8 mg/inch$^2$ or lower, and 14.5 mg/inch$^2$ or lower is more preferable. Although the lower limit of the maximum impact amount is not particularly limited, 12.1 mg/inch$^2$ or more is preferable. By the maximum impact amount being within the range, the abrasion resistance and color development tend to further improve.

Second Heating Step

The second heating step is a step of heating the recording medium to which the ink composition is attached to 40° C. to 120° C. Although not particularly limited, examples of the heating unit in the second heating step include units such as the curing heater 5, a warm-air mechanism (not shown), and a thermostatic bath (not shown). By the heating unit heating the recording medium on which an image is recorded, the water content included in the ink composition is more quickly evaporated and dispersed (dried) and a coating film is formed by the polymer particles included in the ink composition. In this way, the film derived from the ink composition is strongly fixed (attached) on the recording medium, and it is possible for a high quality image with excellent abrasion resistance to be obtained in a short time. It is preferable that the surface temperature of the recording medium is 40° C. to 120° C., 55° C. to 100° C. is more preferable, and 60° C. to 95° C. is still more preferable. It is preferable that the surface temperature of the recording medium in this case is higher than the glass-transition temperature of the polymer included in the shell polymer. Thereby, softening of the shell polymer is promoted, the core polymer flows out from the interior, and it is possible for the adhesiveness and the abrasion resistance to be improved.

The wording "heating the recording medium", refers to the temperature of the recording medium being raised to a predetermined temperature, and is not limited to directly heating the recording medium.

The recording apparatus 1 preferably includes a cooling fan 6. After drying, by cooling the ink composition on the recording medium with the cooling fan 6, a film with better adhesiveness on the recording medium tends to be able to be formed.

The recording apparatus 1 is preferably further provided with an air-flow fan 8 so as to more effectively dry the ink composition attached to the recording medium.

EXAMPLES

Below, the examples and the comparative examples of the invention will be more specifically described. The invention is not limited by any of the following examples.
Material for Ink Composition The main materials for the ink composition used in the examples and the comparative examples are as follows.
Pigments
Cyan Pigment (C.I. Pigment Blue 15:3, average particle diameter 70 μm)
Solvent
1,3-butane diol (boiling point: 207° C.), 1,2-butane diol (boiling point: 193° C.), propylene glycol (boiling point: 189° C.), dipropylene glycol (boiling point: 230° C.), 2-pyrrolidone (boiling point: 245° C.), 1,2-hexanediol (boiling point: 223° C.)
Surfactant
BYK 348 (manufactured by BASF Corporation, silicone-based surfactant), Surfynol DF110D (manufactured by Nissin Chemical Industry Co., Ltd., acetylene glycol-based surfactant),
Resin Emulsion
Joncryl 7100 (manufactured by BASF Corporation, styrene/acrylic aqueous resin emulsion, solid content 48%, Tg −10° C., acid value 51), Joncryl 7610 (manufactured by BASF Corporation, resin emulsion, solid content 52%, Tg 96° C., acid value 50)
pH adjuster
triethanol amine
Chelating Agent
ethylenediamine tetra acetic acid sodium Polymer particles 1 to 3 manufactured as follows were used as the polymer particles. The types and content of the monomer unit in the polymer particles 1 to 3 and the various characteristics of the polymer particles 1 to 3 are as shown in Table 1.

Production Example 1

Polymer Particles 1

A dropping device, a thermometer, a water-cooled reflux condenser, and a stirrer are provided in the reaction container, after 100 parts of ion-exchange water were introduced, and 2 parts of a 10% solution of ammonium persulfate were added while stirring in a nitrogen atmosphere at 70° C. and a reaction liquid formed from 30 parts of ion-exchange water, 56 parts of methyl methacrylate, 7 parts of lauryl methacrylate, 7 parts of acrylic acid, and 0.5 parts of t-dodecylmercaptan was added while being stirred at 70° C. and subjected to polymerization reaction, the resultant was neutralized to a pH of 8 to 8.5 with sodium hydroxide, thereby preparing the shell polymer, and thereafter the core polymer was prepared by dropwise addition of a monomer solution in which 12 parts of styrene, parts of butyl acrylate and 0.02 parts of t-dodecyl mercaptan were added to 0.2 parts of a polymerization initiator of potassium persulfate and 7 parts of ion exchange water and reacted at 70° C. Thereafter, polymer particles 1 were formed by preparing a polymer fine particle-water dispersion filtered with a 1.0 μm filter.

Production Examples 2 to 6

Using the monomer components disclosed in Table 1, the polymer particles 2 to 6 were manufactured by including the same procedure as Production Example 1.

In each of the polymer particles, the glass-transition temperature Tg of the shell polymer and the core polymer is calculated using the FOX formula.
Method of Measuring Average Particle Diameter of Polymer Particles The average particle diameter of the polymer particles was measured using a "Microtrac UPA" (manufactured by Nikkiso Co., Ltd.), measurement conditions of a refractive index of 1.5, and a refractive index of the solvent (water) of 1.333, and the shape of the measured particles was spherical.
Method of Measuring Acid Value of Core Polymer and Shell Polymer of Polymer Particles The acid value of the core polymer of the polymer particles was measured using a potential difference measurement method based on JIS-K 2501 for the polymer component of the core polymer. The acid value of the shell polymer of the polymer particles was measured using a potential difference measurement method based on JIS-K 2501 for the polymer component of the shell polymer.

TABLE 1

| Polymer Used | | Polymer Particles 1 | Polymer Particles 2 | Polymer Particles 3 | Polymer Particles 4 | Polymer Particles 5 | Polymer Particles 6 |
|---|---|---|---|---|---|---|---|
| Tg (° C.) of resin configuring core polymer | | −10 | 0 | 20 | 40 | −10 | 80 |
| Tg (° C.) of resin configuring shell polymer | | 76 | 41 | 76 | 76 | 82 | 72 |
| Shell | MMA | 56 | 45.5 | 38.5 | 56 | 63 | 53.5 |

TABLE 1-continued

| Polymer Used | | Polymer Particles 1 | Polymer Particles 2 | Polymer Particles 3 | Polymer Particles 4 | Polymer Particles 5 | Polymer Particles 6 |
|---|---|---|---|---|---|---|---|
| Component | BMA | 0 | 0 | 0 | 0 | 0 | 0 |
| | LMA | 7 | 17.5 | 7 | 7 | 7 | 5.5 |
| | LA | 0 | 0 | 17.5 | 7 | 0 | 0 |
| | AA | 7 | 7 | 7 | 7 | 0 | 7 |
| Core | BA | 18 | 15 | 12 | 9 | 18 | 2.4 |
| Component | St | 12 | 15 | 18 | 21 | 12 | 27.6 |
| Average Particle Diameter φ (nm) | | 30 | 55 | 53 | 40 | 30 | 40 |
| Acid Value | | 60 | 60 | 60 | 60 | 0 | 60 |
| Total Amount of Monomer | | 100 | 100 | 100 | 100 | 100 | 100 |

MMA: methacrylic acid methyl
BMA: methacrylic acid butyl
LMA: methacrylic acid lauryl
AA: acrylic acid
BA: butyl acrylate
St: styrene Preparation of Ink Composition Each of the material was mixed so as to have the constitutions (mass %) shown in the following Table 2 and sufficiently stirred, thereby obtaining each ink composition.

Method of Measuring Average Particle Diameter of Pigment

The average particle diameter of the pigment was measured using a "Microtrac UPA" (manufactured by Nikkiso Co., Ltd.), measurement conditions of a refractive index of 2.0, and a refractive index of the solvent (water) of 1.333, and the shape of the measured particles was spherical.

Measurement of Surface Tension of Ink Composition

The surface tension of the ink composition was measured at a liquid temperature of 25° C. with the Wilhelmy method using a surface tensiometer (such as a CBVP-Z surface tensiometer manufactured by Kyowa Interface Science Co., Ltd.).

Measurement of Viscosity of Ink Composition

The viscosity at 20° C. and 50° C. of the ink composition is obtained by JIS 28809 compliant measurement using a vibration type viscometer VM-100AL (manufactured by Yamaichi Electronics Co., Ltd.). The viscosity reduction rate was calculated with formula (A) from the obtained viscosity.

Examples 1 to 8, Comparative Examples 1 to 6

Abrasion Resistance

An ink jet printer (product name: PX-G930, manufactured by Seiko Epson Corp.) was filled with the ink composition and a solid pattern was recorded on a PET medium cold laminate film PG-50L (product name, manufactured by Lamy Corporation) recording medium. Specifically, the surface temperature of the recording medium was heated to 50° C., the ink composition was discharged from the nozzles, and attached to the heated recording medium, and the recording medium to which the ink composition was attached was heated to 50° C. for 10 minutes, thereby obtaining a solid pattern. The recording conditions were an impact amount of 14.8 mg/inch$^2$, horizontal resolution of 720 dpi, vertical resolution of 720 dpi, and a duty of 100%.

The solid pattern surface of the obtained recording material was measured for abrasion resistance using an AB-301 Color Fastness Rubbing Tester (manufactured by Tester Sangyo Co., Ltd.) by verifying the peeling state of the solid pattern surface and the ink transfer state to a cotton cloth of when rubbed with a cotton cloth 20 times with a load of 200 g. The evaluation criteria of the abrasion resistance are as follows. The evaluation was performed in a laboratory in room temperature (25° C.) conditions.

A: no ink peeling or ink transfer to the cotton cloth found even after rubbing 20 times.

B: ink peeling or ink transfer to the cotton cloth found after rubbing 11 to 15 times.

C: ink peeling or ink transfer to the cotton cloth found after rubbing 6 to 10 times.

D: ink peeling or ink transfer to the cotton cloth found after rubbing 1 to 5 times.

Aggregation Unevenness

Similar recording materials used in the abrasion resistance testing were used in the evaluation of the aggregation unevenness. The aggregation unevenness of ink in the sold pattern on the recording material was visually observed and evaluated with the following evaluation criteria. The evaluation was performed in a laboratory in room temperature (25° C.) conditions. The entire surface was recorded in white.

A: no aggregation unevenness found in the solid pattern

B: slight aggregation unevenness found in the solid pattern

C: considerable aggregation unevenness generally found in the solid pattern

Clogging Recovery

Each of the ink compositions obtained as described above was filled into ink cartridges, and the ink cartridges were mounted in an ink jet printer (product name: PX-G 930 manufactured by Seiko Epson Corp.). Thereafter, using the printer driver, the head of the printer was filled with the ink composition and it was verified that ordinary recording was possible without the nozzle clogging. Thereafter, the ink cartridge was removed, and left for one week in a 40° C. environment at a position other than the home position (state where head is shifted from position of cap provided in printer and head is not capped). After leaving, the ink composition was again discharged by all nozzles, the number of cleanings necessary until characters equivalent to initially were possible was counted, and the results were determined based on the following criteria.

A: 3 or fewer cleanings until characters equivalent to initially were obtained.

B: 4 or more to 9 or fewer cleanings until characters equivalent to initially were obtained.

C: Characters equivalent to initially were not achieved even with 10 or more cleanings.

TABLE 2

|  |  | Example 1 Ink 1 | Example 2 Ink 2 | Example 3 Ink 3 | Example 4 Ink 4 | Example 5 Ink 5 | Example 6 Ink 6 | Example 7 Ink 7 | Example 8 Ink 8 |
|---|---|---|---|---|---|---|---|---|---|
| Pigment | C.I. Pigment Blue 15:3 | 2 | 2 | 2 | 2 | 2 | 2 | 2 | 2 |
| Solvent | 1,3-butane diol | 10 |  |  |  |  | 10 | 10 | 10 |
|  | 1,2-butane diol |  | 10 |  |  |  |  |  |  |
|  | Propylene Glycol |  |  | 10 |  |  |  |  |  |
|  | Dipropylene Glycol |  |  |  | 10 |  |  |  |  |
|  | 2-pyrrolidone | 10 | 10 | 10 | 10 | 10 | 10 | 10 | 10 |
|  | 1,2-hexanediol | 5 | 5 | 5 | 5 | 15 | 5 | 5 | 5 |
| Surfactant | BYK348 | 0.4 | 0.4 | 0.4 | 0.4 | 0.4 | 0.4 | 0.4 | 0.4 |
|  | Surfynol DF110D | 0.3 | 0.3 | 0.3 | 0.3 | 0.3 | 0.3 | 0.3 | 0.3 |
| Polymer Particles | Polymer Particles 1 | 5 | 5 | 5 | 5 | 5 |  |  |  |
|  | Polymer Particles 2 |  |  |  |  |  | 5 |  |  |
|  | Polymer Particles 3 |  |  |  |  |  |  | 5 |  |
|  | Polymer Particles 4 |  |  |  |  |  |  |  | 5 |
|  | Polymer Particles 5 |  |  |  |  |  |  |  |  |
|  | Polymer Particles 6 |  |  |  |  |  |  |  |  |
| Resin Emulsion | Joncryl 7100 |  |  |  |  |  |  |  |  |
|  | Joncryl 7610 |  |  |  |  |  |  |  |  |
| pH Adjuster | triethanol amine | 0.5 | 0.5 | 0.5 | 0.5 | 0.5 | 0.5 | 0.5 | 0.5 |
|  | ethylenediamine tetra acetic acid sodium | 0.3 | 0.3 | 0.3 | 0.3 | 0.3 | 0.3 | 0.3 | 0.3 |
| Total Amount of Organic Solvent |  | 25.8 | 25.8 | 25.8 | 25.8 | 25.8 | 25.8 | 25.8 | 25.8 |
| Water |  | residue | residue | residue | residue | residue | residue | residue | residue |
| Viscosity (mPa · s) of ink composition at 20° C. |  | 5.6 | 5.3 | 5.8 | 5.4 | 5.4 | 5.6 | 5 | 5.2 |
| Viscosity (mPa · s) of ink composition at 50° C. |  | 3.2 | 3 | 3.1 | 2.9 | 3.1 | 3.3 | 2.6 | 2.7 |
| Viscosity Lowering rate (%) |  | 57 | 57 | 53 | 54 | 57 | 59 | 52 | 53 |
| Surface Tension (mN/m) |  | 26.7 | 26.3 | 26.5 | 26.5 | 25.5 | 26.4 | 26.7 | 26.5 |
| Evaluation | Abrasion Resistance | A | A | A | B | A | A | A | B |
|  | Aggregation Unevenness | B | A | A | B | B | B | A | A |
|  | Clogging Recovery | A | A | A | A | B | A | B | B |

|  |  | Comparative Example 1 Ink 9 | Comparative Example 2 Ink 10 | Comparative Example 3 Ink 11 | Comparative Example 4 Ink 12 | Comparative Example 5 Ink 13 | Comparative Example 6 Ink 14 |
|---|---|---|---|---|---|---|---|
| Pigment | C.I. Pigment Blue 15:3 | 2 | 2 | 2 | 2 | 2 | 2 |
| Solvent | 1,3-butane diol | 10 | 10 | 20 | 10 | 10 | 10 |
|  | 1,2-butane diol |  |  |  |  |  |  |
|  | Propylene Glycol |  |  | 5 |  |  |  |
|  | Dipropylene Glycol |  |  |  |  |  |  |
|  | 2-pyrrolidone | 10 | 10 | 10 | 10 | 10 | 10 |
|  | 1,2-hexanediol | 5 | 5 | 5 | 5 | 5 | 5 |
| Surfactant | BYK348 | 0.4 | 0.4 | 0.4 | 0.4 | 0.4 | 0.4 |
|  | Surfynol DF110D | 0.3 | 0.3 | 0.3 | 0.3 | 0.3 | 0.3 |
| Polymer Particles | Polymer Particles 1 | 0 | 0 | 5 | 0.5 | 0.5 | 0.5 |
|  | Polymer Particles 2 |  |  |  |  |  |  |
|  | Polymer Particles 3 |  |  |  |  |  |  |
|  | Polymer Particles 4 |  |  |  |  |  |  |
|  | Polymer Particles 5 |  |  |  |  | 5 |  |
|  | Polymer Particles 6 |  |  |  |  |  | 5 |
| Resin Emulsion | Joncryl 7100 | 5 |  | 5 |  |  |  |
|  | Joncryl 7610 |  | 5 |  |  |  |  |
| pH Adjuster | triethanol amine | 0.5 | 0.5 | 0.5 | 0.5 | 0.5 | 0.5 |
|  | ethylenediamine tetra acetic acid sodium | 0.3 | 0.3 | 0.3 | 0.3 | 0.3 | 0.3 |
| Total Amount of Organic Solvent |  | 25.8 | 25.8 | 25.8 | 25.8 | 25.8 | 25.8 |
| Water |  | residue | residue | residue | residue | residue | residue |
| Viscosity (mPa · s) of ink composition at 20° C. |  | 4.8 | 5.5 | 6.5 | 4.1 | 4.1 | 4.1 |
| Viscosity (mPa · s) of ink composition at 50° C. |  | 1.8 | 3.1 | 4.1 | 2.1 | 2.1 | 2.1 |
| Viscosity Lowering rate (%) |  | 38 | 56 | 63 | 51 | 51 | 51 |
| Surface Tension (mN/m) |  | 26.3 | 26.2 | 26.3 | 26.3 | 26.3 | 26.3 |
| Evaluation | Abrasion Resistance | A | B | A | A | C | C |
|  | Aggregation Unevenness | B | B | C | B | C | B |
|  | Clogging Recovery | C | C | B | C | C | C |

What is claimed is:

1. An ink composition, comprising:
a pigment;
polymer particles; and
a polar solvent with a boiling point of 150° C. or higher,
wherein the polymer particles include a core polymer and a shell polymer that covers at least a portion of the core polymer,
a glass transition point of the polymer that configures the core polymer is more than 10° C. lower than the glass transition point of the polymer that configures the shell polymer,
the polymer that configures the shell polymer includes a polymer having a (meth)acrylate monomer unit and a carboxylic acid monomer unit,
the content (solid content conversion) of the polymer particles is 1.0 mass % to 10 mass % with respect to the total amount of the ink composition,
the content of the polar solvent is 10 mass % to 40 mass % of the total amount of the ink composition, and
the viscosity reduction rate from the viscosity at 20° C. to the viscosity at 50° C. is 40% to 80%.

2. The ink composition according to claim 1,
wherein the polar solvent includes 5.0 mass % or more of the polar solvent with a boiling point of 190° C. or higher and 220° C. or lower, with respect to the total amount of the ink composition.

3. A recording method, comprising:
a first heating step of heating a recording medium to a surface temperature of 30° C. to 70° C.;
discharging the ink composition of claim 2 from a nozzle, and attaching the ink composition on the heated recording medium; and
a second heating step of heating the recording medium to which the ink composition is attached to 40° C. to 120° C.

4. The ink composition according to claim 1,
wherein the content of the polar solvent with a boiling point of 260° C. or higher is 5.0 mass % or less with respect to the total amount of the ink composition.

5. A recording method, comprising:
a first heating step of heating a recording medium to a surface temperature of 30° C. to 70° C.;
discharging the ink composition of claim 4 from a nozzle, and attaching the ink composition on the heated recording medium; and
a second heating step of heating the recording medium to which the ink composition is attached to 40° C. to 120° C.

6. The ink composition according to claim 1,
wherein the polar solvent includes 5 mass % or more of a nitrogen-containing solvent with respect to the total amount of the ink composition.

7. A recording method, comprising:
a first heating step of heating a recording medium to a surface temperature of 30° C. to 70° C.;
discharging the ink composition of claim 6 from a nozzle, and attaching the ink composition on the heated recording medium; and
a second heating step of heating the recording medium to which the ink composition is attached to 40° C. to 120° C.

8. The ink composition according to claim 1,
wherein recording is performed on a heated recording medium.

9. A recording method, comprising:
a first heating step of heating a recording medium to a surface temperature of 30° C. to 70° C.;
discharging the ink composition of claim 8 from a nozzle, and attaching the ink composition on the heated recording medium; and
a second heating step of heating the recording medium to which the ink composition is attached to 40° C. to 120° C.

10. The ink composition according to claim 1,
wherein the glass transition point of the polymer that configures the core polymer is −10° C. or higher to 60° C. or lower.

11. A recording method, comprising:
a first heating step of heating a recording medium to a surface temperature of 30° C. to 70° C.;
discharging the ink composition of claim 10 from a nozzle, and attaching the ink composition on the heated recording medium; and
a second heating step of heating the recording medium to which the ink composition is attached to 40° C. to 120° C.

12. The ink composition according to claim 1,
wherein the glass transition point of the polymer that configures the shell polymer is 40° C. or higher.

13. A recording method, comprising:
a first heating step of heating a recording medium to a surface temperature of 30° C. to 70° C.;
discharging the ink composition of claim 12 from a nozzle, and attaching the ink composition on the heated recording medium; and
a second heating step of heating the recording medium to which the ink composition is attached to 40° C. to 120° C.

14. The ink composition according to claim 1,
wherein the polymer particles include 0.50 mass % to 20 mass % of specified polymer particles with respect to the total amount of the polymer particles,
the specified polymer particles have a mass ratio (c/s) of the mass of the core polymer (c) and the mass of the shell polymer (s) of 0.40 to 4.0, and a ratio ((c/s)/φ) between the average particle diameter φ (unit: nm) of the polymer particles and the mass ratio (c/s) of 0.010 or more.

15. The ink composition according to claim 1,
wherein the acid value of the polymer that configures the core polymer is 30 mgKOH/g or less, and the acid value of the polymer that configures the shell polymer is 20 to 400 mgKOH/g.

16. The ink composition according to claim 1,
wherein the polymer that configures the core polymer includes a polymer having a hydrophobic monomer unit, and
the polymer that configures the shell polymer includes a polymer having a methyl (meth)acrylate monomer unit or an ethyl (meth)acrylate monomer unit.

17. A recording method, comprising:
a first heating step of heating a recording medium to a surface temperature of 30° C. to 70° C.;
discharging the ink composition of claim 1 from a nozzle, and attaching the ink composition on the heated recording medium; and
a second heating step of heating the recording medium to which the ink composition is attached to 40° C. to 120° C.

18. An ink composition, comprising:
a pigment;
polymer particles; and
a polar solvent with a boiling point of 150° C. or higher,
wherein the polymer particles include a core polymer and a shell polymer that covers at least a portion of the core polymer,
a glass transition point of the polymer that configures the core polymer is more than 10° C. lower than the glass transition point of the polymer that configures the shell polymer,
the polymer that configures the shell polymer includes a polymer having a (meth)acrylate monomer unit and a carboxylic acid monomer unit,
the content (solid content conversion) of the polymer particles is 1.0 mass % to 10 mass % with respect to the total amount of the ink composition,
the content of the polar solvent is 10 mass % to 40 mass % of the total amount of the ink composition, and
the acid value of the polymer that configures the core polymer is 30 mgKOH/g or less, and the acid value of the polymer that configures the shell polymer is 20 to 400 mgKOH/g.

* * * * *